United States Patent
Dautenhahn et al.

(10) Patent No.: US 9,501,340 B2
(45) Date of Patent: Nov. 22, 2016

(54) MECHANISM FOR FACILITATING DYNAMIC AND EFFICIENT MANAGEMENT OF INSTRUCTION ATOMICITY VIOLATIONS IN SOFTWARE PROGRAMS AT COMPUTING SYSTEMS

(71) Applicants:Nathan D. Dautenhahn, Champaign, IL (US); Justin E. Gottschlich, Fort Collins, CO (US); Gilles Pokam, Livermore, CA (US); Cristiano L. Pereira, Groveland, CA (US); Shiliang Hu, San Jose, CA (US); Klaus Danne, Braunschweig (DE); Rolf Kassa, Braunschweig (DE)

(72) Inventors: Nathan D. Dautenhahn, Champaign, IL (US); Justin E. Gottschlich, Fort Collins, CO (US); Gilles Pokam, Livermore, CA (US); Cristiano L. Pereira, Groveland, CA (US); Shiliang Hu, San Jose, CA (US); Klaus Danne, Braunschweig (DE); Rolf Kassa, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 13/977,690

(22) PCT Filed: Mar. 15, 2013

(86) PCT No.: PCT/US2013/032640
§ 371 (c)(1),
(2) Date: Jun. 29, 2013

(87) PCT Pub. No.: WO2014/143059
PCT Pub. Date: Sep. 18, 2014

(65) Prior Publication Data
US 2014/0281705 A1    Sep. 18, 2014

(51) Int. Cl.
*G06F 9/45*     (2006.01)
*G06F 11/07*    (2006.01)
(Continued)

(52) U.S. Cl.
CPC .......... *G06F 11/0724* (2013.01); *G06F 9/3895* (2013.01); *G06F 9/3897* (2013.01); *G06F 11/1438* (2013.01); *G06F 11/1484* (2013.01)

(58) Field of Classification Search
CPC .............. G06F 8/313–8/314; G06F 9/3895; G06F 9/3897; G06F 11/0724; G06F 11/1438; G06F 11/1484
USPC ................................. 717/119, 149
See application file for complete search history.

(56) References Cited

U.S. PATENT DOCUMENTS 6,405,326 B1    6/2002  Azagury et al.
8,032,706 B2 *  10/2011 Zheltov ............... G06F 11/366
                                                        711/118

(Continued)

FOREIGN PATENT DOCUMENTS

WO    WO2012-087402    6/2012

OTHER PUBLICATIONS

AVIO: Detecting Atomicity Violations via Access Interleaving Invariants Shan Lu, Joseph Tucek, Feng Qin and Yuanyuan Zhou Department of Computer Science, University of Illinois at Urbana Champaign, Urbana, IL—ASPLOS'06 Oct. 21.25, 2006.*

(Continued)

*Primary Examiner* — Francisco Aponte
(74) *Attorney, Agent, or Firm* — Blakely, Sokoloff, Taylor & Zafman LLP (57) ABSTRACT

A mechanism is described for facilitating dynamic and efficient management of instruction atomicity violations in software programs according to one embodiment. A method of embodiments, as described herein, includes receiving, at a replay logic from a recording system, a recording of a first software thread running a first macro instruction, and a second software thread running a second macro instruction. The first software thread and the second software thread are executed by a first core and a second core, respectively, of a processor at a computing device. The recording system may record interleavings between the first and second macro instructions. The method includes correctly replaying the recording of the interleavings of the first and second macro instructions precisely as they occurred. The correctly replaying may include replaying a local memory state of the first and second macro instructions and a global memory state of the first and second software threads.

14 Claims, 7 Drawing Sheets

(51) Int. Cl.
*G06F 9/38* (2006.01)
*G06F 11/14* (2006.01)

(56) References Cited

U.S. PATENT DOCUMENTS

| | | | | |
|---|---|---|---|---|
| 8,185,874 B2* | 5/2012 | Ball | ................. | G06F 9/524 |
| | | | | 717/124 |
| 8,402,318 B2* | 3/2013 | Nieh | ................. | G06F 11/3419 |
| | | | | 714/15 |
| 8,510,722 B2* | 8/2013 | Yang | ................. | G06F 11/3608 |
| | | | | 717/131 |
| 8,533,681 B2* | 9/2013 | Zhou | ................. | G06F 11/3612 |
| | | | | 717/126 |
| 8,862,942 B2* | 10/2014 | Jalbert | ................. | G06F 11/3632 |
| | | | | 714/11 |
| 9,038,048 B2* | 5/2015 | Yang | ................. | G06F 8/65 |
| | | | | 717/110 |
| 9,081,628 B2* | 7/2015 | Ma | ................. | G06F 9/52 |
| 9,128,781 B2* | 9/2015 | Kranich | ................. | G06F 9/526 |
| 9,129,058 B2* | 9/2015 | Cui | ................. | G06F 11/3466 |
| 9,317,297 B2* | 4/2016 | Gottschlich | ................. | G06F 9/3851 |
| 2003/0131283 A1 | 7/2003 | Shmuel et al. | | |
| 2011/0022893 A1 | 1/2011 | Yue et al. | | |
| 2011/0264959 A1* | 10/2011 | Subhraveti | ................. | G06F 11/3636 |
| | | | | 714/35 |
| 2012/0011491 A1* | 1/2012 | Eldar | ................. | G06F 11/3612 |
| | | | | 717/130 |
| 2012/0239987 A1* | 9/2012 | Chow | ................. | G06F 9/45533 |
| | | | | 714/49 |
| 2015/0120996 A1* | 4/2015 | Pokam | ................. | G06F 9/30043 |
| | | | | 711/105 |

OTHER PUBLICATIONS

Atom-Aid: Detecting and Surviving Atomicity Violations—Brandon Lucia, Joseph Devietti, Luis Ceze—Computer Science and Engineering University of Washington—Karin Strauss, Advanced Architecture and Technology Laboratory AMD—2008.*

Virtues and Obstacles of Hardware-assisted Multi-processor Execution Replay Cristiano Pereira, Gilles Pokam, Klaus Danne, Ramesh Devarajan, and Ali-Reza Adl-Tabatabai Intel Corporation—2010.*

CTrigger: Exposing Atomicity Violation Bugs from Their Hiding Places—Soyeon Park Shan Lu Yuanyuan Zhou Department of Computer Science, University of Illinois at Urbana Champaign, Urbana, IL—ASPLOS'09 Mar. 7.11, 2009, Washington, DC.*

CoreRacer: A Practical Memory Race Recorder for Multicore x86 TSO Processors—Gilles Pokam, Cristiano Pereira, Shiliang Hu, Ali-Reza Adl-Tabatabai, Justin Gottschlich, Youfeng Wu—Intel Corporation—Jungwoo Ha—Google—MICRO'11, Dec. 3-7, 2011, Porto Alegre, Brazil.*

PCT/US2013/032640 Notification of Transmittal of the International Search Report and the Written Opinion of the International Searching Authority, or the Declaration, Mailed Dec. 18, 2013, 10 pages.

Ahmad Heydari, et al., A Survey in Deterministic Relaying Approaches in Multiprocessors, International Journal of Electrical & Computer Sciences, Aug. 2010, vol. 10, Issue 4, pp. 23-29.

* cited by examiner

MECHANISM FOR FACILITATING DYNAMIC AND EFFICIENT MANAGEMENT OF INSTRUCTION ATOMICITY VIOLATIONS IN SOFTWARE PROGRAMS AT COMPUTING SYSTEMS

CROSS-REFERENCE TO RELATED APPLICATION

This patent application is a U.S. National Phase Application under 35 U.S.C. §371 of International Application No. PCT/US2013/032640, filed Mar. 15, 2013, entitled MECHANISM FOR FACILITATING DYNAMIC AND EFFICIENT MANAGEMENT OF INSTRUCTION ATOMICITY VOLATIONS IN SOFTWARE PROGRAMS AT COMPUTING SYSTEMS.

FIELD

Embodiments described herein generally relate to computer programming. More particularly, embodiments relate to a mechanism for facilitating dynamic and efficient management of instruction atomicity violations in software programs at computing systems.

BACKGROUND

Multi-threaded and/or multi-core processors are commonplace today. They are used in various types of computing devices such as servers, desktops, laptops, netbooks, tablets, smartphones, and cell phones, to name just a few examples. With the increase in multicore technology, parallel programming has become ubiquitous the trend to increasingly more threads and/or cores is expect to continue into the future. Unfortunately, writing correct and efficient parallel programs continues to be a challenge for many developers because of any number of factors.

One factor in particular that contributes to the difficulty in debugging is the non-deterministic nature of the execution of such software. For example, the threads of a multi-threaded program may interleave differently from one execution of the program to the next. Such variance in the interleaving of the threads may cause variance into the ordering of the accesses by the threads to shared memory from one execution of the program to the next. For example, the threads may access the shared memory in one particular interleaved order one time the program is executed, but the threads may access the shared memory in a different interleaved order another time the program is executed.

Some types of bugs in particular may be difficult to analyze, debug, and fix, as a result of such non-deterministic execution behavior. For example, concurrency bugs may only occur under some but not all thread interleavings and/or shared memory access orderings. For example, a concurrency bug may occur one time a program is executed with a particular thread interleaving (and/or shared memory access ordering), but the concurrency bug may not occur another time the program is executed with a different thread interleaving (and/or different shared memory access ordering). This may tend to make it difficult for a software developer, software debugger, or the like, to know, let alone reproduce, the particular thread interleaving and/or shared memory access ordering that resulted in the concurrency bug.

This tends to lead to greater programming inefficiencies, waste of resources, such as power, time, performance, human resources, etc., and further leads to higher software development costs and/or potential delays in bringing the multi-threaded or parallel processing software to market.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for correctly detecting, recording, and replaying instruction atomicity violations ("IAVs") of within programming or computing instructions, such as with respect to or when dealing with single macro instructions. Using the hardware-based memory race recording (MRR) technology, an "always-on" recording of parallel programs may be enabled which may then be replayed to produce a result in which the parallel programs were original executed. Further, MRR may use chunks (representing logical groupings of multiple, sequential instructions from a single thread) to improve efficiently over instruction ordering of their reduced spatial hardware from footprint and relaxed ordering constraints in software playback.

Embodiments provides a mechanism to overcome any challenging corner cases associated with a chunk-based MRR system, such as with replaying MRR recorded programs, by facilitating a correct and precise replay of program recordings to properly, dynamically, and efficiently detect any atomicity violations occurring with an instruction, such as a single macro instruction. Conventional systems' failure to correctly replay recorded programs leaves many concurrency violations undetected. Embodiments facilitate accurate replaying of recorded programs, such as correct and deterministic replaying of recorded parallel programs to replay instructions exactly as they were recorded including potentially interleaved instructions from other threads, to detect and reproduce any and all concurrency violations in parallel programs.

Figure 1:
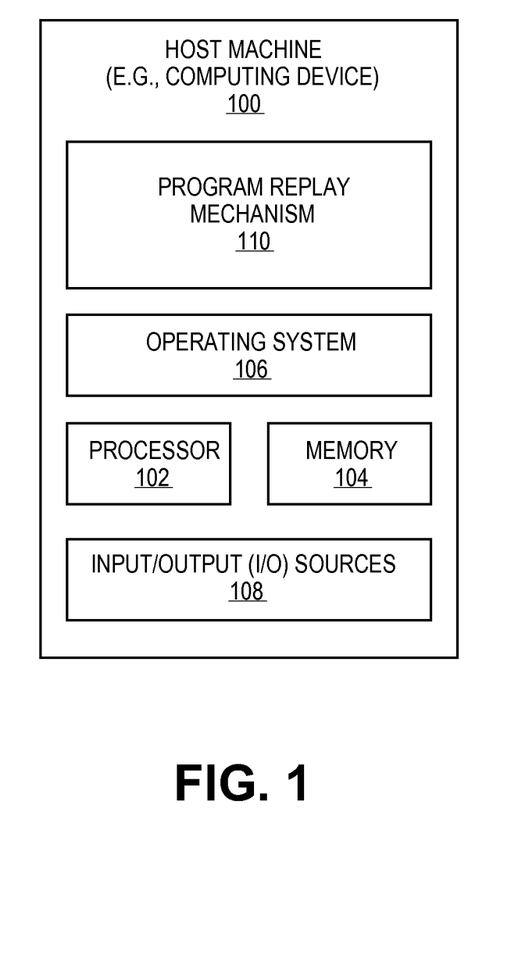
FIG. 1 illustrates a program replay mechanism for facilitating recording/replaying-based management of instruction violations in software programs according to one embodiment.

FIG. 1 illustrates a program replay mechanism 110 for facilitating recording/replaying-based management of instruction violations in software programs according to one embodiment. Computing device 100 serves as a host machine to employ program replay mechanism ("replay mechanism") 110 for facilitating a recording and replaying-based management (including reproduction) of instruction-based violations (e.g., IAVs) in software programs at computing devices, such as computing device 100. In one embodiment, violations management mechanism 110 employs or includes a recording system (e.g., MRR-based recording system using chunks, etc.) to produce recordings of programming instructions and further employs or includes a novel recording player to precisely and efficiently replay such recordings so that any violations, such as instruction atomicity violations, may be accurately reproduced and managed. It is to be noted that terms like "play" and "replay and other equivalent terms like "playing", "replaying", "player", "replayer", and the like, may be used interchangeably throughout this document. For example, "replay" is in no way limited to only multiple or subsequent instances of playing a recording and that it may also include the first time playing.

In one embodiment, replay mechanism 110 facilitates correct replaying of recorded programs, such as accurate and deterministic replaying of recorded parallel programs to replay instructions as they were exactly recorded including potentially interleaved instructions from other threads, to detect and reproduce any and all concurrency violations in parallel programs. For example, using replay mechanism 110, atomicity violations within a single macro instruction may be accurately replayed using MRR recording technology. The correct replaying of the recorded program may refer to an accurate and deterministic replaying of the recorded program such that the replayed execution precisely enforces or re-enforces all instruction interleavings that were originally recorded while maintaining a precise memory state both prior to and during each instruction's execution. Further, in one embodiment, the correct replaying of the recorded program instructions may be performed by replay mechanism 110 even as new instructions are added to an existing instruction set architecture ("ISA").

Computing device 100 may include mobile computing devices, such as cellular phones including smartphones (e.g., iPhone® by Apple®, BlackBerry® by Research in Motion®, etc.), personal digital assistants (PDAs), etc., tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "host", "server", "memory server", "machine", "device", "computing device", "computer", "computing system", and the like, may be used interchangeably throughout this document.

Figure 2A:
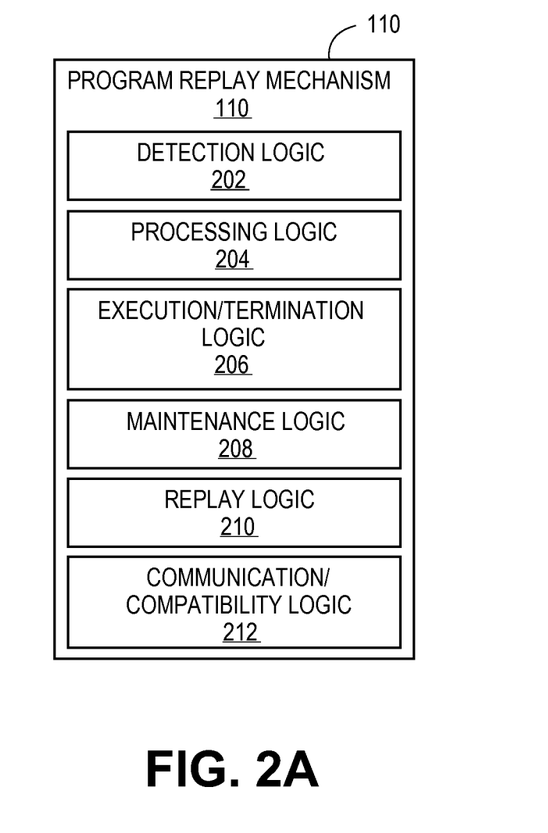
FIG. 2A illustrates a program replay mechanism according to one embodiment.

FIG. 2A illustrates a program replay mechanism 110 according to one embodiment. In one embodiment, program replay mechanism 110 includes a number of components, such as detection logic 202, processing logic 204, execution/termination logic 206, replay logic ("play logic", "player", or simply "replayer") 208, and communication/compatibility logic 210. Throughout this document, "logic" may be interchangeably referred to as "component" or "module" and may include, by way of example, software, hardware, and/or any combination of software and hardware, such as firmware.

Figure 3:
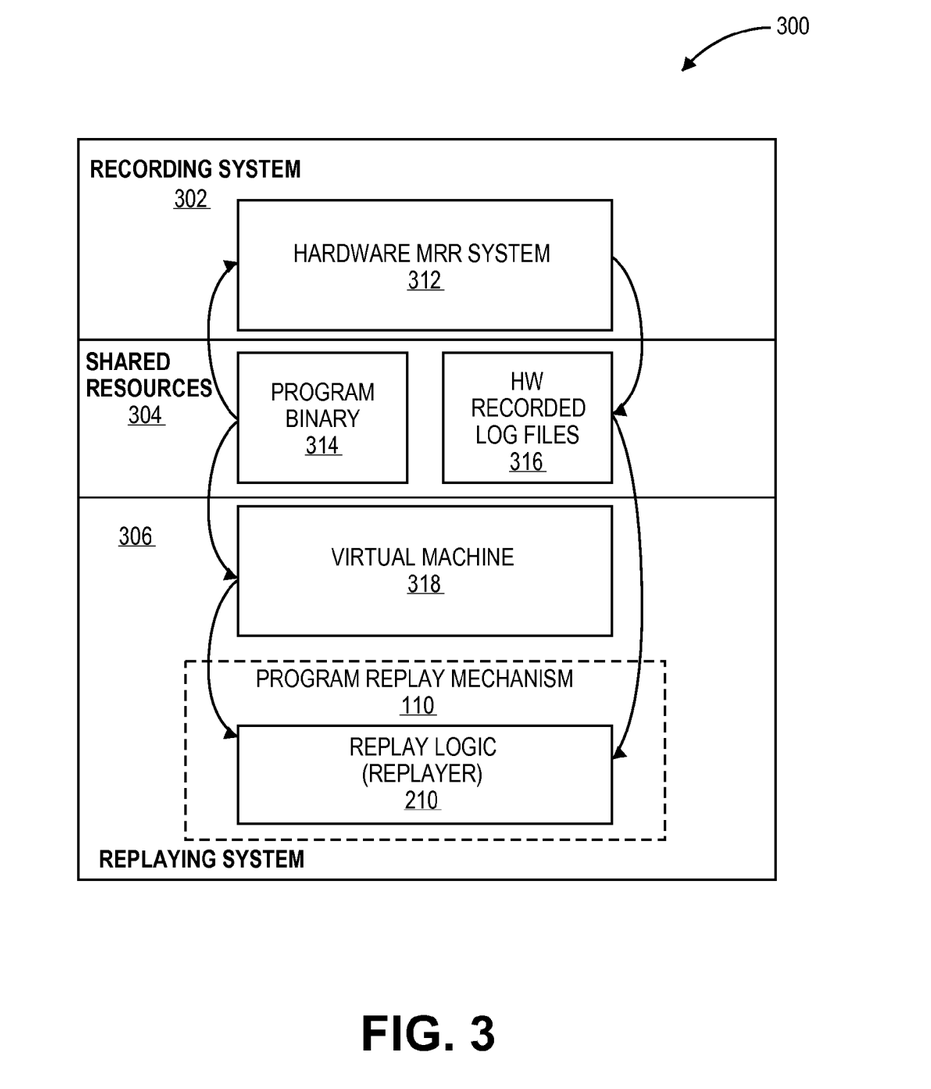
FIG. 3 illustrates an architecture for dynamic and efficient management of instruction atomicity violations in software programs at computing systems according to one embodiment.

In one embodiment, program replay mechanism 110 includes replay logic 208 to correctly play or replay a recording to detect, play, reproduce, etc., any and all instruction atomicity violations (e.g., _asm inc) that may occur within a single macro instruction and as may be recorded on or by an MRR recording system, such as the hardware-based MRR system 308 of FIG. 3. Now consider a single inc assembly instruction that is expanded into its micro-operation (e.g., memory operation) components as follows:

$$inc\ x \begin{cases} ld\ tmp, 0\times3 \\ inc\ tmp \\ st\ 0\times3, tmp \end{cases}$$

This above example begins to illustrate how a single macro-operation may result in an instruction atomicity violation if, for example, a secondary thread were to execute precisely between certain micro-operations within the single this inc macro-operation instruction. To illustrate, for example, consider the following:

$$inc\ x \begin{cases} \text{Thread 1} \\ ld\ tmp, 0\times3 \\ inc\ tmp \\ \\ st\ 0\times3, tmp \end{cases} inc\ y \begin{cases} \text{Thread 2} \\ ld\ tmp, 0\times3 \\ inc\ tmp \\ st\ 0\times3, tmp \end{cases} \Bigg] \text{TIME}$$

The above illustrates two identical inc instructions, inc x and inc y, macro-instructions or macro-operations running side-by-side on two different thread, thread 1 and thread 2. In this example, thread 1 performs the load and inc portions of the inc macro-operation on the shared-variable x. However, thread 2 subsequently executes a complete inc operation on the shared-memory variable y, interrupting the last of the inc x micro-operations on thread 1 at inc temp. Meanwhile, over time, upon execution of the entire operation of inc y on thread 2, thread 1 subsequently resumes and commits stale tmp value (e.g., st 0×3, tmp) to the shared-memory variable x, overwriting the update on x that was performed by thread 2, resulting in a lost update instruction atomicity violation, where one of the inc operations is lost.

In one embodiment, to continue with the above example, to avoid this sort of situation and the resulting violation or loss, replay logic 208 may provide for a correct replay this instruction by enforcing, for example, an internal memory state of the macro-operation experiencing the atomicity violation, as well as a global memory state observed by all threads of the application. In the above example, it is to be observed that each instruction has two memory views, an internal local memory and an external global memory.

For example, if the replayed program only replays instructions at the macro-level, then the instruction atomicity violation may not be observed during replay and the lost update may be accidentally eliminated, causing replay to reproduce an execution that is unfaithful to the original recording. If the instruction from thread 1 executes first during replay then the global memory state as read by thread 2 in the ld tmp, 0×3 micro-operation, may be different than during the original record because the st 0×3, tmp micro-operation of thread 1 may be present in the global memory at the time the instruction from thread 2 is executed, which may result in an incorrectly replayed program and may hide concurrency that may be recorded by the MRR recorder.

Accordingly, in one embodiment, both the local and global memory states of each instruction are precisely maintained in relation to their recording, including the memory state as modified by micro-operations. Further, in one embodiment, replay mechanism 110 facilitates maintenance of these memory properties for each instruction, enabling replay logic 208 to correctly replay MRR recorded applications. For example, various memory operations of IAVs may be interrupted and a combination of emulation of micro-operations and speculative execution of the macro-instruction is used to capture the global visible memory state as observed during the recording.

Figure 4A:
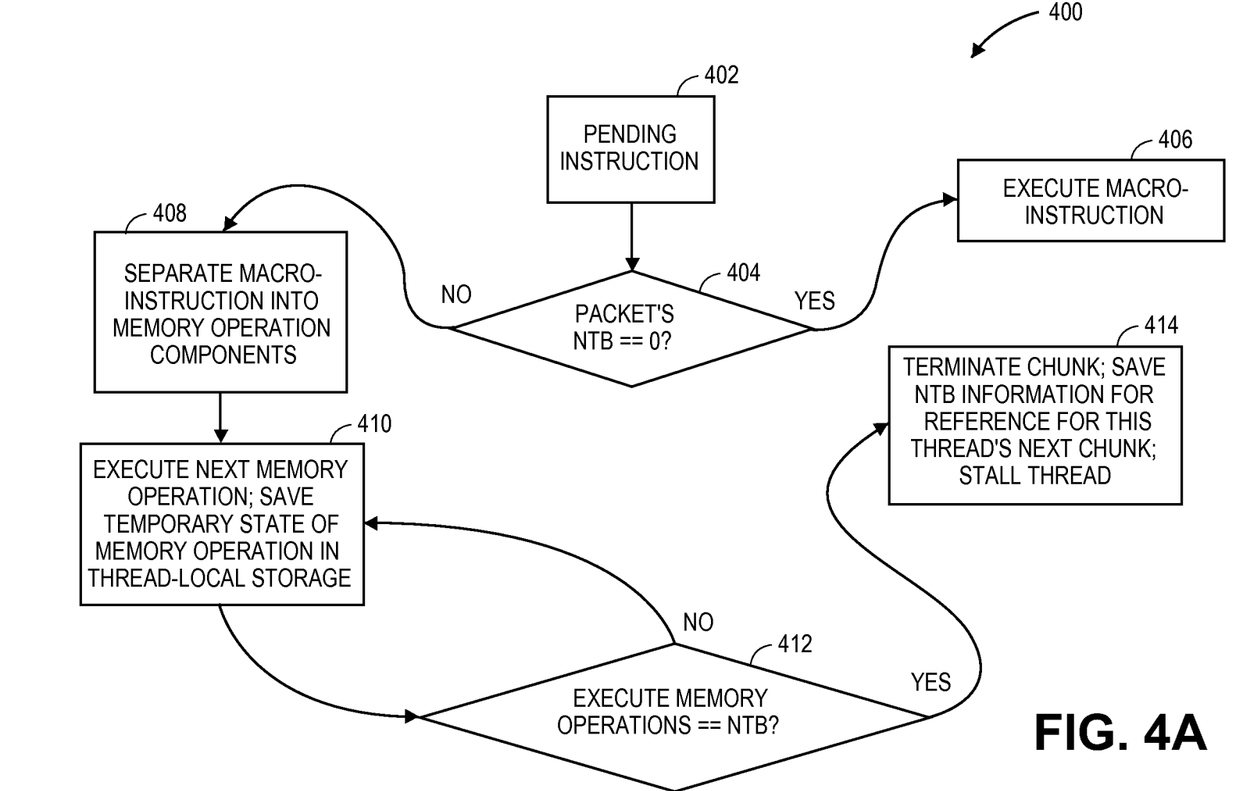
FIG. 4A illustrates a method for facilitating dynamic and efficient management of instruction atomicity violations in software programs according to one embodiment.
Figure 4B:
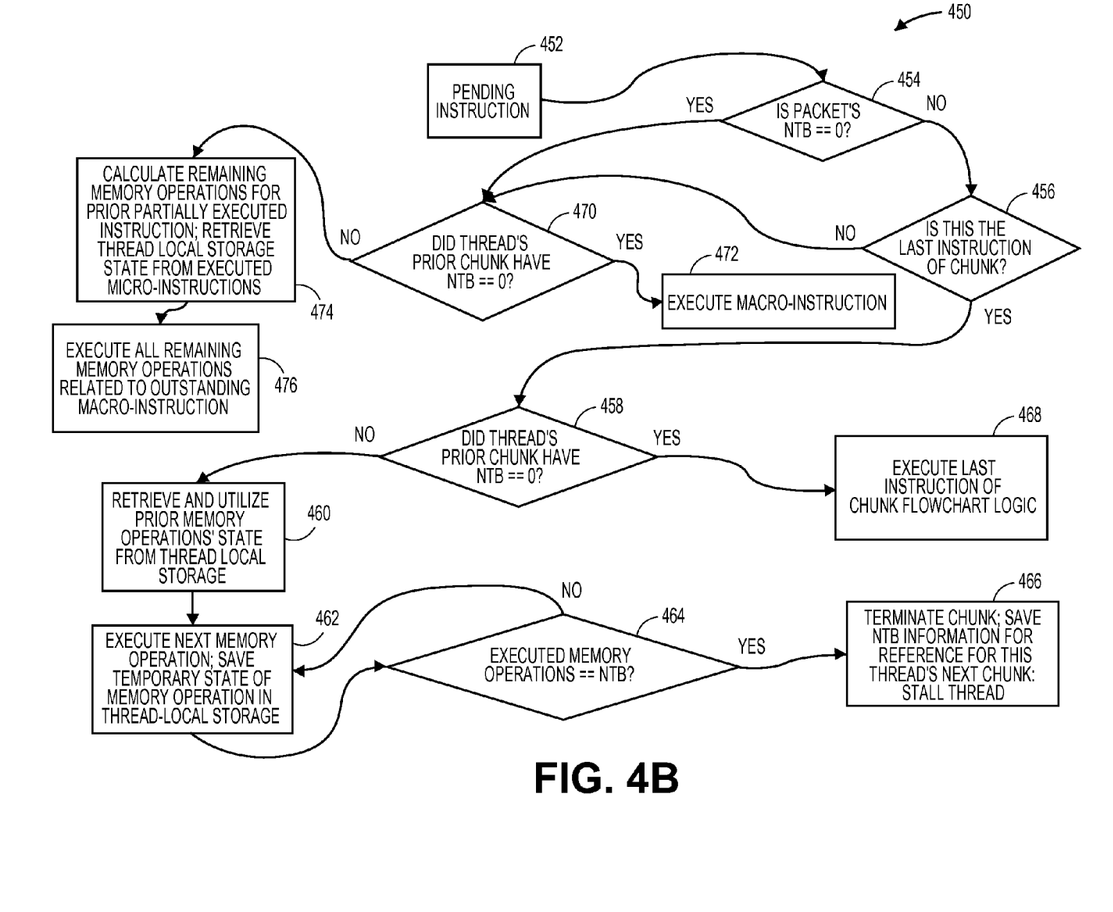
FIG. 4B illustrates a method for facilitating dynamic and efficient management of instruction atomicity violations in software programs according to one embodiment.

In one embodiment, for example, using chunk-based MRR, as illustrated with reference to FIG. 2B, field or fields (e.g., NTB field) may be assigned to each packet to work with detection logic 202 to precisely capture a number of operations that are executed within the chunk. As will be further described with reference to FIGS. 4A-4B, in one embodiment, detection logic 202 detects the packet's NTB value relating to a pending instruction. It is contemplated that a field assigned to or selected for capturing the number of operations is not limited to the NTB field and that any number, type, and size of fields may be used for this purpose. The NTB value may provide information regarding the current state of the chunk of instructions, such as whether the instruction has been completed or interrupted or still running as is illustrated with regard to FIGS. 4A-4B. Processing logic 204 may include various modules, such as a calculation module, a separation module, a retrieve and utilize module, etc., to perform certain calculation and determinations based on the information detected by detection module 202. For example, as illustrated in FIG. 4A, if the packet's NTB is determined to be non-zero, processing logic 204, via its separation module, may separate macro-instructions into memory operation components. Similarly, as illustrated in FIG. 4B, processing logic 204, via its calculation module, may calculate remaining memory operations for the prior partially executed instruction, etc., if the packet's NTB equals zero, but the thread's prior chunk, NTB value is not zero.

Execution/termination logic 206 may perform any number of operations, such as execution of a macro-instruction (such as when it is conclusively determined that NTB equals zero and that there is no violation), execution of the next memory operation if, for example, the NTB value does not equal zero and upon conducting separation of macro-instruction into memory operation components by separation module of processing logic 204. Similarly, execution/termination logic 206 may terminate a chunk if, for example, executed memory operations equal the NTB value.

Program replay mechanism further includes maintenance logic 208 to maintain a variety of information in order to maintain information about the local and global memory states of each instruction precisely in relation to its recording, including the memory state as modified by micro-operations. Further, for example, maintenance logic 208 may be used to maintain information like the NTB information of the subject thread's next chunk as a future reference while execution logic 206 terminates the chunk and stalls the thread, etc., as illustrated with reference to FIG. 4B. Although maintenance logic 208 may be used to maintain any amount and type of data for calculation purposes or as future reference, in one embodiment, a database in communication with replay mechanism 110, locally and/or remotely, may be used to store any and all of the data.

In one embodiment, using the information detected through detection logic 202, processed through processing logic 204, and maintained through maintenance logic 208, replay logic 210 performs correct replaying of the MRR-based/chunk-based recording. As illustrated and described with reference to FIG. 3, in one embodiment, a chunk-based, MRR-based hardware system may be used to obtain hardware MRR-generated thread interleaving logs of a recorded application, information denoting the internal state of instructions that experience atomicity violations, a virtual machine binary instrumentation tool to interpose on memory accesses by instructions, and the replay algorithm for enforcing correct replay of IAVs, etc. For example, each macro-instruction may be intercepted by processing logic 204, as recorded by the hardware MRR-based system, and using MRR chunk logs, a determination may be made as to whether an instruction incurred an atomicity violation and subsequently, for each operand of the instruction, a correct memory state enforcement may be emulated. Further, in case of the atomicity violation, the MRR system may identify, and detection logic 202 may detect, exactly how many memory operations had successfully completed in the macro-instruction prior to the atomicity violation. This information may be processed by processing logic 204 and maintained by maintenance logic 208 to be used by replay logic 210 to replay the exact same number of memory operations prior to an interleaved chunk execution from another thread.

In case of an IAV, maintenance logic 208 may facilitate preservation of, for example, the following invariants: 1) any full or partial load ("LD") micro-operation occurring prior to the interleaved chunk's execution may be stored to a temporary local memory prior to the replay of the interleaved chunk; 2) any full or partial LD micro-operation occurring after the interleaved chunk's execution may be read into the instruction's local memory state after interleaved chunk's execution; 3) any full or partial store ("ST") micro-operation occurring prior to the interleaved chunk's execution may be made visible to global memory prior to the interleaved chunk's execution; and 4) any full or partial ST micro-operation occurring after the interleaved chunk's execution in record may be made visible to global memory only after the interleaved chunk is executed. The subsequent figures provide details of the aforementioned invariants and how they are enforced during replay via replay logic 210.

The following reflects MRR recoded log files containing chunk-ordering information that are used to preserve correct program playback.

The MRR-generated thread interleaving logs, as shown above, may be used by replay logic 210 to enforce execution, via execution/termination logic 206, such that shared memory accesses during the recording phase are replayed exactly as they were recorded by the hardware-based MRR recording system. These logs may include the shared-memory ordering dependencies within the original execution.

Communication/configuration logic 212 may facilitate the ability to dynamically communicate and stay configured with various virtual machines, compilers, programming codes, instructions, recording systems, shared resources, etc. Communication/configuration logic 216 further facilitates the ability to dynamically communicate and stay configured with various computing devices (e.g., mobile computing devices (such as various types of smartphones, tablet computers, laptop, etc.), networks (e.g., Internet, cloud-computing network, etc.), websites (such as social networking websites (e.g., Facebook®, LinkedIn®, Google+®, etc.)), etc., while ensuring compatibility with changing technologies, parameters, protocols, standards, etc.

It is contemplated that any number and type of components may be added to and/or removed from program replay mechanism 110 to facilitate various embodiments including adding, removing, and/or enhancing certain features. For brevity, clarity, ease of understanding, and to avoid obscuring program replay mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
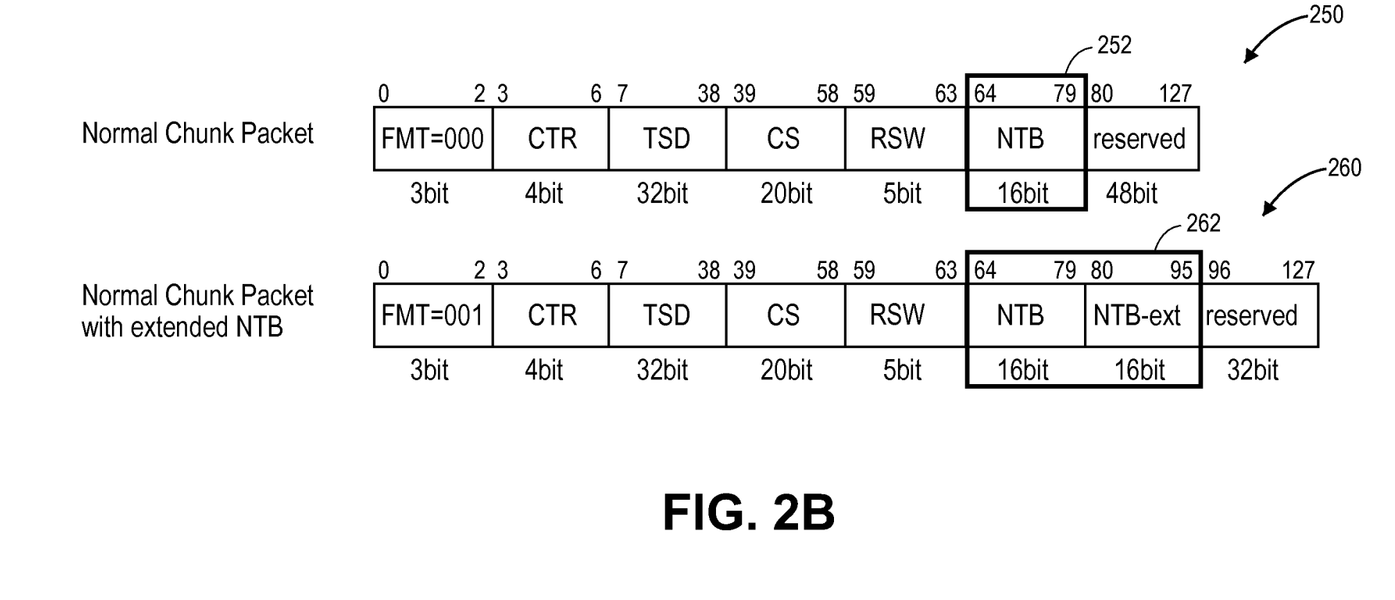
FIG. 2B illustrates chunk packets having dedicated packet encodings in one embodiment.

Now referring to FIG. 2B, it illustrates chunk packets 250, 260 having dedicated packet encodings 252, 262 in one embodiment. In one embodiment, chunk packet 250 includes a 16-bit field or packet encoding, such as NTB 252, to precisely capture the exact number of memory operations that are executed within a chunk. For example, as illustrated, with regard to chunk packet 250, the rectangular portion from bit 64 through bit 79 indicates the portion of the NTB packet encoding 252 that is used to capture how many memory operations the last macro-instruction executed prior to chunk termination. If this (NTB) value is 0, the macro-instruction is regarded as executed to completion. If, however, the NTB value is non-zero (e.g., a number greater than zero), then the number indicates the exact number of memory operations that are executed. Similarly, chunk packet 260 includes an extended NTB 262 having a 16-bit NTB from bit 64 through bit 79 and a 16-bit NTB-extended from bit 80 through bit 95. In one embodiment, an MRR packet encoding may provide NTB information through NTB fields 252, 262 which, in one embodiment, may then be used to indicate the number of memory operations of the last macro-instruction that were executed prior to the terminating of the corresponding chunk. It is contemplated that a field assigned to or selected for capturing the number of operations is not limited to NTB fields and that any number, type, and size of fields may be used for this purpose. Additionally, for example, the field set aside for the aforementioned purposes may be of any size, such as NTB-extended field 262 may not be limited to 32-bit and that it may be of any number greater than the bits occupied by standard NTB field 252.

FIG. 3 illustrates an architecture 300 for dynamic and efficient management of instruction atomicity violations in software programs at computing systems according to one embodiment. It is to be noted that for brevity, clarity, ease of understanding, and to avoid obscuring program replay mechanism 110 of FIG. 1, many of the components and details mentioned above with reference to the previous figures are not repeated here and similarly, much of the known information about computing systems, virtual machines, program binaries, recording systems, etc., are not discussed here.

In the illustrated embodiment, a chunk-based hardware MRR system 312 is employed a recording system 312 at a computing system. For example, a first processor core may execute a first software thread, while a second processor core may execute a second software thread. MMR system 312 may have memory monitor logic to monitor the access to memory of, for example, the first thread and record memory addresses associated with the monitored accesses and further, detect any data races involving the recorded memory addresses with other threads. Moreover, chunk generation logic of MRR system 312 may be used to generate chunks to represent committed execution of the first software thread, where each chunk may include a number of instructions of the first software thread executed and committed and a time stamp, the chunk generation logic may stop generation of a current chunk in response to detection of a data race by the memory monitor logic. Further, a chunk buffer may be employed in communication with the chunk generation logic, where the chunk buffer temporarily stores chunks until the chunks are transferred out of the processor.

Any information recorded by the MRR system 312 may then be made part of shared resources 304 by having it registered at hardware recorded log files 316. Further, a virtual machine ("VM") 318 may be used to facilitate binary instrumentation and memory instruction control such that VM 318 allows instructions that would be executed from the original program binary 314 to be, instead redirected to replay logic 210 of program replay mechanism 110 of replaying system 306. In one embodiment, replay logic 210 emulates the original executed instructions by, for example, capturing loads and emulating the instruction to capture data for writes to ensure that any concurrency violations are corrected replayed.

FIG. 4A illustrates a method 400 for facilitating dynamic and efficient management of instruction atomicity violations in software programs according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by program replay mechanism 110 of FIG. 1.

Method 400 includes a process relating to the last instruction of a chunk and begins with a pending instruction at block 402. At block 404, a determination is made as to whether the chunk packet's NTB equals zero. If yes, the process continues with executing the macro-instruction at block 406. If not, the macro instruction is separated into memory operation components at block 408 and further, at block 410, a next memory operation is executed and a temporary state of the memory operation is saved in thread-local storage at block. At block 412, a determination is made as to whether the executed memory operations equal NTB. If not, the process returns to block 410. If yes, at block 414, the process continues with terminating the chunk and saving any NTB information for reference for this thread's next chunk and stalling the thread.

FIG. 4B illustrates a method 450 for facilitating dynamic and efficient management of instruction atomicity violations in software programs according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed by program replay mechanism 110 of FIG. 1.

Method 400 includes a process relating to the first instruction of a chunk and begins with a pending instruction at block 452. At block 454, a determination is made as to whether the pending instruction's chunk packet's NTB equals zero. If not, another determination is made as to whether the pending instruction is the last instruction of the chunk at block 456. If the instruction is not the last instruction or, referring back to block 454, if the packet's NTB equals zero, the process continues with another determination as to if the thread's prior chunk had NTB value equaling zero at block 470. If yes, the macro-instruction is executed at block 472. If not, the process continues at block 474 with calculating remaining memory operations for prior partially executed instruction and the thread local storage state is retrieved from executed microinstructions. Subsequently, at block 476, all remaining memory operations relating to the outstanding macro-instruction are executed.

Referring back to block 456, if the pending instruction is determined to be the last instruction of the chunk, at block 458, a determination is made as to if the thread's prior chunk had NTB value equaling zero. If yes, the last instruction of the chunk is executed at block 468. If not, the process continues with retrieval and utilization of any prior memory operations' state from the thread local storage at block 460. At block 462, the process continues with the execution of the next memory operation and saving of temporary state of memory operation in the thread local storage. At block 464, another determination is made as to whether the executed memory operations equal NTB. If not, the process returns to block 462. If yes, the chunk is terminated and any NTB information is saved to be served as a reference for this thread's next chunk while the thread is stalled at block 466.

Figure 5:
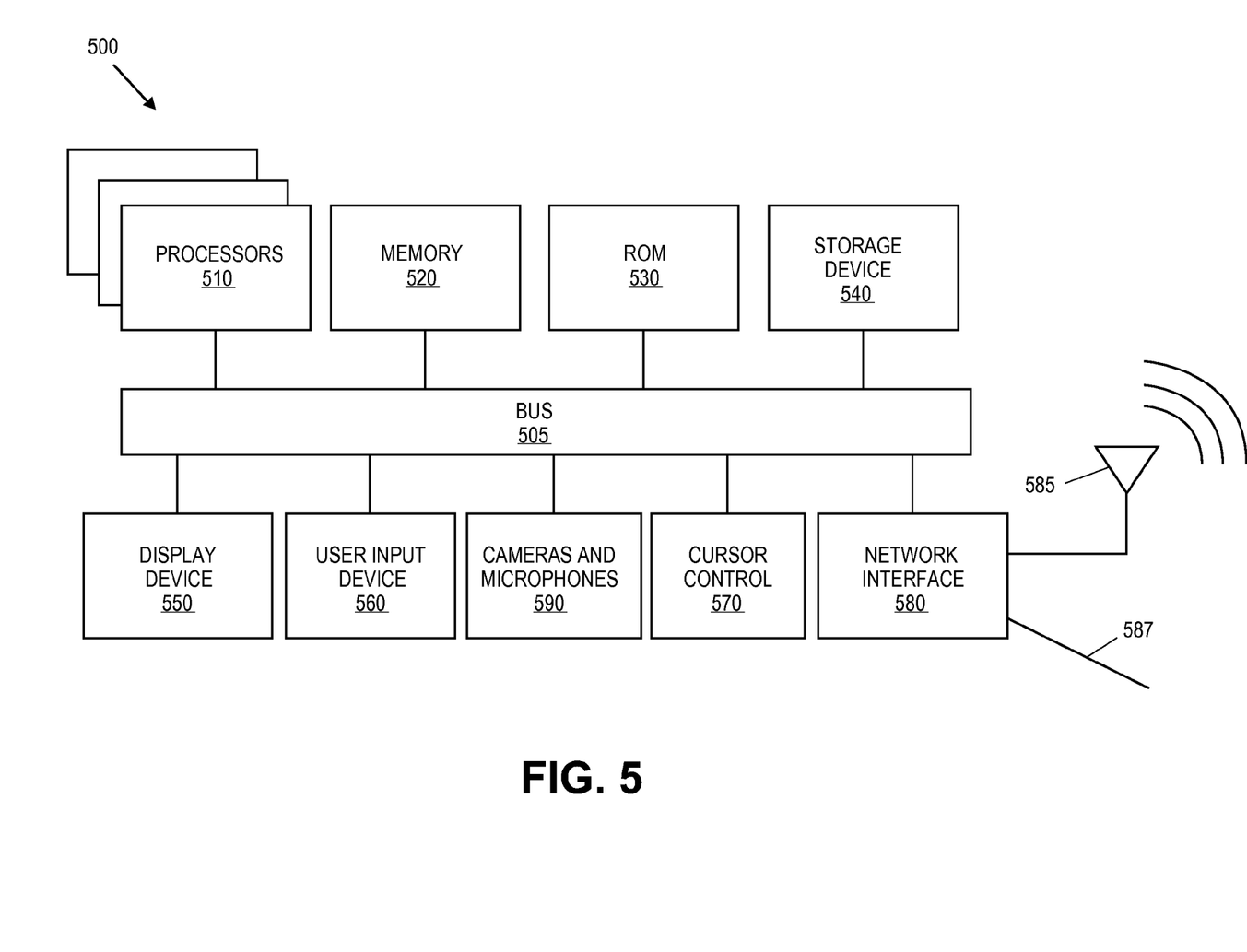
FIG. 5 illustrates computer system suitable for implementing embodiments of the present disclosure according to one embodiment.

FIG. 5 illustrates an embodiment of a computing system 500. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 500 includes bus 505 (or a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: receiving, at a replay logic from a recording system, a recording of a first software thread running a first macro instruction, and a second software thread running a second macro instruction, wherein the first software thread and the second software thread are executed by a first core and a second core, respectively, of a processor at a computing device, wherein the recording system to record interleavings between the first and second macro instructions; and correctly replaying the recording of the interleavings of the first and second macro instructions precisely as they occurred, wherein correctly replaying includes replaying a local memory state of the first and second macro instructions and a global memory state of the first and second software threads.

Embodiments or examples include any of the above methods further comprising detecting the interleavings of the first and second macro instructions in the recording as recorded by the recording system.

Embodiments or examples include any of the above methods further comprising processing the interleavings to determine precise information relating the first and second macro instructions' one or more microinstructions involved in the interleavings and resulting in an instruction atomicity violation occurring in the local memory state or the global memory state.

Embodiments or examples include any of the above methods further comprising maintaining the information and allowing the replay logic to correctly replay the recording of the interleavings, wherein the recording is produced by the recording system and provided to the replay logic via one or more of hardware recorded log files, program binary, and a virtual machine (VM).

Embodiments or examples include any of the above methods wherein correctly replaying the recording having the interleavings comprises precisely reproducing each microinstruction at a precise stage including enforcing the local memory state of the first macro instruction or the second macro instruction experiencing the instruction atomicity violation and the global memory state as observed by the first and second software threads, wherein the instruction atomicity violation is caused by an interception in running of the one or more microinstructions of the first macro instruction or the second macro instruction.

Embodiments or examples include any of the above methods wherein the recording system includes a hardware-based memory race recording (MRR) system using chunks, wherein a chunk refers to a logical grouping of multiple, sequential instructions from a single software thread including the first software thread or the second software thread.

Embodiments or examples include any of the above methods wherein the chunk comprises a package chunk including a encoding to provide information relating to a state of the first macro instruction or the second macro instruction, wherein the encoding includes a 16-bit NTB encoding or a 32-bit extended NTB encoding.

Embodiments or examples include any of the above methods wherein the computing system comprises one or more of a desktop computer, a server computer, a set-top box, a mobile computer including one or more of a smartphone, a personal digital assistant (PDA), a tablet computer, an e-reader, and a laptop computer.

Another embodiment or example includes an apparatus to perform any of the methods mentioned above.

In another embodiment or example, an apparatus comprises means for performing any of the methods mentioned above.

In yet another embodiment or example, at least one machine-readable storage medium comprising a plurality of instructions that in response to being executed on a computing device, causes the computing device to carry out a method according to any of the methods mentioned above.

In yet another embodiment or example, at least one non-transitory or tangible machine-readable storage medium comprising a plurality of instructions that in response to being executed on a computing device, causes the computing device to carry out a method according to any of the methods mentioned above.

In yet another embodiment or example, a computing device arranged to perform a method according to any of the methods mentioned above.

Some embodiments pertain to an apparatus comprising: replay logic to receive a recording, from a recording system, of a first software thread running a first macro instruction, and a second software thread running a second macro instruction, wherein the first software thread and the second software thread are executed by a first core and a second core, respectively, of a processor at a computing device, wherein the recording system to record interleavings between the first and second macro instructions; and the replay logic is further to correctly replay the recording of the interleavings of the first and second macro instructions precisely as they occurred, wherein correctly replaying includes replaying a local memory state of the first and second macro instructions and a global memory state of the first and second software threads.

Embodiments or examples include any of the above apparatus further comprising detection logic to detect the interleavings of the first and second macro instructions in the recording as recorded by the recording system.

Embodiments or examples include any of the above apparatus further comprising processing logic to process the interleavings to determine precise information relating the first and second macro instructions' one or more microinstructions involved in the interleavings and resulting in an instruction atomicity violation occurring in the local memory state or the global memory state.

Embodiments or examples include any of the above apparatus further comprising maintenance logic to maintain the information and allowing the replay logic to correctly replay the recording of the interleavings, wherein the recording is produced by the recording system and provided to the replay logic via one or more of hardware recorded log files, program binary, and a virtual machine (VM).

Embodiments or examples include any of the above apparatus wherein correctly replaying the recording having the interleavings comprises precisely reproducing each microinstruction at a precise stage including enforcing the local memory state of the first macro instruction experiencing the instruction atomicity violation and the global memory state as observed by the first and second software threads, wherein the atomicity violations is caused by an interception in running of the one or more microinstructions of the first macro instruction or the second macro instruction.

Embodiments or examples include any of the above apparatus wherein the recording system includes a hardware-based memory race recording (MRR) system using chunks, wherein a chunk refers to a logical grouping of multiple, sequential instructions from a single software thread including the first software thread or the second software thread.

Embodiments or examples include any of the above apparatus wherein the chunk comprises a package chunk including a encoding to provide information relating to a state of the first macro instruction or the second macro instruction, wherein the encoding includes a 16-bit NTB encoding or a 32-bit extended NTB encoding.

Embodiments or examples include any of the above apparatus wherein the computing system comprises one or more of a desktop computer, a server computer, a set-top box, a mobile computer including one or more of a smartphone, a personal digital assistant (PDA), a tablet computer, an e-reader, and a laptop computer.

Some embodiments pertain to a system comprising: a computing device having a memory to store instructions, and a processing device to execute the instructions, the computing device further having a mechanism to: receive, at a replay logic from a recording system, a recording of a first software thread running a first macro instruction, and a second software thread running a second macro instruction, wherein the first software thread and the second software thread are executed by a first core and a second core, respectively, of a processor at a computing device, wherein the recording system to record interleavings between the first and second macro instructions; and correctly replay the recording of the interleavings of the first and second macro instructions precisely as they occurred, wherein correctly replaying includes replaying a local memory state of the first and second macro instructions and a global memory state of the first and second software threads.

Embodiments or examples include any of the above system wherein the mechanism is further to detect the interleavings of the first and second macro instructions in the recording as recorded by the recording system.

Embodiments or examples include any of the above system wherein the mechanism is further to process the interleavings to determine precise information relating the first and second macro instructions' one or more microinstructions involved in the interleavings and resulting in an instruction atomicity violation occurring in the local memory state or the global memory state.

Embodiments or examples include any of the above system further comprising maintaining the information and allowing the replay logic to correctly replay the recording of the interleavings, wherein the recording is produced by the recording system and provided to the replay logic via one or more of hardware recorded log files, program binary, and a virtual machine (VM).

Embodiments or examples include any of the above system wherein correctly replaying the recording having the interleavings comprises precisely reproducing each micro-instruction at a precise stage including enforcing the local memory state of the first macro instruction or the second macro instruction experiencing the instruction atomicity violation and the global memory state as observed by the first and second software threads, wherein the instruction atomicity violations is caused by an interception in running of the one or more microinstructions of the first macro instruction or the second macro instruction.

Embodiments or examples include any of the above system wherein the recording system includes a hardware-based memory race recording (MRR) system using chunks, wherein a chunk refers to a logical grouping of multiple, sequential instructions from a single software thread including the first software thread or the second software thread.

Embodiments or examples include any of the above system wherein the chunk comprises a package chunk including a encoding to provide information relating to a state of the first macro instruction or the second macro instruction, wherein the encoding includes a 16-bit NTB encoding or a 32-bit extended NTB encoding.

Embodiments or examples include any of the above system wherein the computing system comprises one or more of a desktop computer, a server computer, a set-top box, a mobile computer including one or more of a smartphone, a personal digital assistant (PDA), a tablet computer, an e-reader, and a laptop computer.

Embodiments or examples include any of the above system wherein the recording system includes a hardware-based memory race recording (MRR) system using chunks, wherein a chunk refers to a logical grouping of multiple, sequential instructions from a single software thread including the first software thread or the second software thread.

Embodiments or examples include any of the above system wherein the chunk comprises a package chunk including an encoding to provide information relating to a state of the first macro instruction or the second macro instruction, wherein the encoding includes a standard NTB and an extended NTB, wherein the standard NTB includes a 16-bit NTB encoding, and wherein the extended NTB includes an NTB encoding that is greater than 16-bit NTB encoding.

Embodiments or examples include any of the above system wherein the computing system comprises one or more of a desktop computer, a server computer, a set-top box, a mobile computer including one or more of a smartphone, a personal digital assistant (PDA), a tablet computer, an e-reader, and a laptop computer.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   replay logic to receive a recording, from a recording system, of a first software thread running a first macro-instruction, and a second software thread running a second macro-instruction, wherein the first software thread and the second software thread are executed by a first core and a second core, respectively, of a processor at a computing device, wherein the recording system to record interleavings between the first and second macro-instructions,
   wherein the replay logic is further to correctly replay the recording of the interleavings of the first and second macro-instructions precisely as they occurred, wherein correctly replaying includes replaying a local memory state of the first and second macro-instructions and a global memory state of the first and second software threads; and
   maintenance logic to maintain the information and allowing the replay logic to correctly replay the recording of the interleavings, wherein the recording is produced by the recording system and provided to the replay logic via one or more of hardware recorded log files, program binary, and a virtual machine (VM),
   wherein correctly replaying the recording having the interleavings comprises precisely reproducing each micro-instruction at a precise stage including enforcing the local memory state of the first macro-instruction or the second macro-instruction experiencing the instruction atomicity violation and the global memory state as observed by the first and second software threads, wherein the instruction atomicity violation is caused by an interleaving in one or more micro-instructions of the first macro-instruction with the second macro-instructions,
   wherein the recording system includes a hardware-based memory race recording (MRR) system using chunks, wherein a chunk refers to a logical grouping of multiple, sequential instructions from a single software thread including the first software thread or the second software thread, and
   wherein the chunk comprises a package chunk including encoding to provide information relating to a state of the first macro-instruction or the second macro-instruction, wherein the encoding includes a standard reference field (NTB) and an extended NTB, wherein the standard NTB includes a 16-bit NTB encoding, and wherein the extended NTB includes an NTB encoding that is greater than 16-bit NTB encoding.

2. The apparatus of claim 1, further comprising detection logic to detect the interleavings of the first and second macro-instructions in the recording as recorded by the recording system.

3. The apparatus of claim 1, further comprising processing logic to process the interleavings to determine precise information relating the first and second macro-instructions' one or more micro-instructions involved in the interleavings and resulting in an instruction atomicity violation occurring in the local memory state or the global memory state.

4. The apparatus of claim 1, wherein the computing system comprises one or more of a desktop computer, a server computer, a set-top box, a mobile computer including one or more of a smartphone, a personal digital assistant (PDA), a tablet computer, an e-reader, and a laptop computer.

5. A method comprising:

receiving, by a recording system, a recording of a first software thread running a first macro-instruction, and a second software thread running a second macro-instruction, wherein the first software thread and the second software thread are executed by a first core and a second core, respectively, of a processor at a computing device, wherein the recording system to record interleavings between the first and second macro-instructions;

correctly replaying the recording of the interleavings of the first and second macro-instructions precisely as they occurred, wherein correctly replaying includes replaying a local memory state of the first and second macro-instructions and a global memory state of the first and second software threads; and maintaining the information and allowing correct replaying of the recording of the interleavings, wherein the recording is produced by the recording system and provided via one or more of hardware recorded log files, program binary, and a virtual machine (VM), wherein correctly replaying the recording having the interleavings comprises precisely reproducing each micro-instruction at a precise stage including enforcing the local memory state of the first macro-instruction or the second macro-instruction experiencing the instruction atomicity violation and the global memory state as observed by the first and second software threads, wherein the instruction atomicity violation is caused by an interleaving between one or more micro-instructions of the first macro-instruction and the second macro-instruction, wherein the recording system includes a hardware-based memory race recording (MRR) system using chunks, wherein a chunk refers to a logical grouping of multiple, sequential instructions from a single software thread including the first software thread or the second software thread, and wherein the chunk comprises a package chunk including an encoding to provide information relating to a state of the first macro-instruction or the second macro-instruction, wherein the encoding includes a standard reference field (NTB) and an extended NTB, wherein the standard NTB includes a 16-bit NTB encoding, and wherein the extended NTB includes an NTB encoding that is greater than 16-bit NTB encoding.

6. The method of claim 5, further comprising detecting the interleavings of the first and second macro-instructions in the recording as recorded by the recording system.

7. The method of claim 5, further comprising processing the interleavings to determine precise information relating the first and second macro-instructions' one or more micro-instructions involved in the interleavings and resulting in an instruction atomicity violation occurring in the local memory state or the global memory state.

8. A system comprising:

a computing device having a memory to store instructions, and a processing device to execute the instructions, the computing device further having a mechanism to:

receive, at a recording system, a recording of a first software thread running a first macro instruction, and a second software thread running a second macro-instruction, wherein the first software thread and the second software thread are executed by a first core and a second core, respectively, of a processor at a computing device, wherein the recording system to record interleavings between the first and second macro-instructions; and correctly replay the recording of the interleavings of the first and second macro-instructions precisely as they occurred, wherein correctly replaying includes replaying a local memory state of the first and second macro-instructions and a global memory state of the first and second software threads, wherein correctly replaying the recording having the interleavings comprises precisely reproducing each micro-instruction at a precise stage including enforcing the local memory state of the first macro-instruction or the second macro-instruction experiencing the instruction atomicity violation and the global memory state as observed by the first and second software threads, wherein the atomicity violations is caused by an interleaving between one or more micro-instructions of the first macro-instruction and the second macro-instruction, wherein the recording system includes a hardware-based memory race recording (MRR) system using chunks, wherein a chunk refers to a logical grouping of multiple, sequential instructions from a single software thread including the first software thread or the second software thread, and wherein the chunk comprises a package chunk including an encoding to provide information relating to a state of the first macro-instruction or the second macro-instruction, wherein the encoding includes a standard reference field (NTB) and an extended NTB, wherein the standard NTB includes a 16-bit NTB encoding, and wherein the extended NTB includes an NTB encoding that is greater than 16-bit NTB encoding.

9. The system of claim 8, wherein the mechanism is further to detect the interleavings of the first and second macro-instructions in the recording as recorded by the recording system.

10. The system of claim 9, wherein the mechanism is further to process the interleavings to determine precise information relating the first and second macro-instructions' one or more micro-instructions involved in the interleavings and resulting in an instruction atomicity violation occurring in the local memory state or the global memory state.

11. The system of claim 8, further comprising maintaining the information and allowing correct replaying of the recording of the interleavings, wherein the recording is produced by the recording system and provided via one or more of hardware recorded log files, program binary, and a virtual machine (VM).

12. At least one non-transitory machine-readable medium comprising a plurality of instructions that in response to being executed on a computing device, causes the computing device to carry out one or more operations comprising:

receiving, by a recording system, a recording of a first software thread running a first macro-instruction, and a second software thread running a second macro-instruction, wherein the first software thread and the second software thread are executed by a first core and a second core, respectively, of a processor at a computing device, wherein the recording system to record interleavings between the first and second macro-instructions;

correctly replaying the recording of the interleavings of the first and second macro-instructions precisely as they occurred, wherein correctly replaying includes replaying a local memory state of the first and second macro-instructions and a global memory state of the first and second software threads; and maintaining the information and allowing correctly replaying the recording of the interleavings, wherein the recording is produced by the recording system and provided via one or more of hardware recorded log files, program binary, and a virtual machine (VM), wherein correctly replaying the recording having the interleavings comprises precisely reproducing each micro-instruction at a precise stage including enforcing the local memory state of the first macro-instruction or the second macro-instruction experiencing the instruction atomicity violation and the global memory state as observed by the first and second software threads, wherein the instruction atomicity violation is caused by an interleaving between one or more micro-instructions of the first macro-instruction and the second macro-instruction, wherein the recording system includes a hardware-based memory race recording (MRR) system using chunks, wherein a chunk refers to a logical grouping of multiple, sequential instructions from a single software thread including the first software thread or the second software thread, and wherein the chunk comprises a package chunk including an encoding to provide information relating to a state of the first macro-instruction or the second macro-instruction, wherein the encoding includes a standard reference field (NTB) and an extended NTB, wherein the standard NTB includes a 16-bit NTB encoding, and wherein the extended NTB includes an NTB encoding that is greater than 16-bit NTB encoding.

13. The non-transitory machine-readable medium of claim 12, wherein the one or more operations comprise detecting the interleavings of the first and second macro-instructions in the recording as recorded by the recording system.

14. The non-transitory machine-readable medium of claim 12, wherein the one or more operations comprise processing the interleavings to determine precise information relating the first and second macro-instructions' one or more micro-instructions involved in the interleavings and resulting in an instruction atomicity violation occurring in the local memory state or the global memory state.

* * * * *